US005153377A

United States Patent [19]

Kuwashima et al.

[11] Patent Number: 5,153,377

[45] Date of Patent: Oct. 6, 1992

[54] IMAGE FORMING APPARATUS

[75] Inventors: Tetsuhito Kuwashima; Hiroyuki Suematsu; Hisayuki Ochi; Manabu Ohno, all of Yokohama, Japan

[73] Assignee: Canon Kabushiki Kaisha, Tokyo, Japan

[21] Appl. No.: 558,505

[22] Filed: Jul. 27, 1990

[30] Foreign Application Priority Data

Jul. 28, 1989 [JP] Japan .......... 1-194029

[51] Int. Cl.[5] .......... G03G 15/09; H04N 1/23

[52] U.S. Cl. .......... 118/657; 358/300; 355/251; 430/106.6; 430/122; 430/903

[58] Field of Search .......... 430/106.6, 120, 122, 430/109, 903

[56] References Cited

U.S. PATENT DOCUMENTS

| | | | |
|---|---|---|---|
| 3,863,603 | 2/1975 | Buckley et al. . | |
| 4,057,666 | 11/1977 | Drummond, Jr. | 428/35 |
| 4,522,907 | 6/1985 | Mitsuhashi et al. | 430/102 |
| 4,939,060 | 7/1990 | Tomiyama et al. | 430/106.6 |
| 4,966,829 | 10/1990 | Yasuda et al. | 430/109 |

FOREIGN PATENT DOCUMENTS

| | | |
|---|---|---|
| 0259819 | 3/1988 | European Pat. Off. . |
| 57-66443 | 4/1982 | Japan . |
| 58-178380 | 10/1983 | Japan . |

Primary Examiner—Roland Martin

[57] ABSTRACT

An image forming apparatus is constituted by an image-bearing member for bearing a latent image, and a developing apparatus for developing the latent image. The developing apparatus is constituted by a developer container for containing a toner, and a developer-carrying member for carrying and conveying the toner contained in the developer container to a developing zone opposite the image-bearing member. The developer-carrying member is provided with a coating layer containing electroconductive fine particles. A developer suitable for use in the above developing apparatus is given by a toner, which comprises a binder resin composition which contains 10–70 wt. % of a THF (tetrahydrofuran)-insoluble content and the remainder of a THF-soluble content including a component with a molecular weight of 10000 or below on a GPC (gel permeation chromatography) chromatogram of the THF-soluble content constituting 10–50 wt. % of the binder resin.

39 Claims, 3 Drawing Sheets

IMAGE FORMING APPARATUS

FIELD OF THE INVENTION AND RELATED ART

The present invention relates to a technical field of developing electrostatic latent images with a developer, particularly to an image forming apparatus wherein a developer is used for development under constraint of a magnetic force.

Hitherto, there has been known, e.g., a type of developing apparatus for visualizing a latent image formed on a photosensitive drum as an electrostatic latent image-bearing member with a magnetic toner, wherein a charge of a polarity opposite to that of the latent image is imparted to the magnetic toner by mutual friction between magnetic toner particles and friction between a sleeve as a developer-carrying member, and the magnetic toner is applied on the sleeve in a very small thickness and conveyed to a developing zone formed by the sleeve and the photosensitive drum, so that, in the developing zone, the magnetic toner is caused to jump onto the electrostatic latent image on the photosensitive drum under the action of a magnetic field given by a magnet fixed within the sleeve.

In the above-described developing apparatus, a very thin uniform toner layer must be formed on the sleeve but the formation of a uniform layer can fail in some cases depending on environmental conditions, toner properties and the surface state of the sleeve, particularly in a low humidity environment.

As the copying or printing is repeated, non-developing materials such as an additive for improving the toner fluidity or a carrier in a two-component type developer may be deposited on the sleeve or a binder resin in the developer may form a film on the sleeve due to repetitive friction between the developer and the sleeve, whereby the developing characteristic of the developer can be unstable or the transfer of the developer onto the electrostatic latent image surface can be unstable.

In order to prevent the change in surface state of the sleeve, there have been raised several proposals of coating the sleeve surface with a substance having a high releasability, including: formation of a coating layer comprising inorganic polymeric fluorocarbon (JP-A 57-66443); formation of a releasable resin layer containing silica dispersed therein (JP-A 58-178380); formation of a coating film comprising at least one of organic silicone polymers, aliphatic fluorine-containing compounds, styrene resins and polyphenylene oxide (U.S. Pat. No. 4,522,907).

Such a coated sleeve having a coating of a synthetic resin on the sleeve, however, has a relatively soft surface compared with a conventional sleeve of aluminum or SUS (stainless steel), so that the developer is pushed against the coating surface during repetitive developing operation to result in irregular abrasion of or scratches in the surface of the developer-carrying member or attachment of a component of the developer. As a result, the expected performance of such a coated sleeve is liable to be deteriorated. This tendency becomes pronounced especially when a magnetic toner containing a magnetic material is used.

A toner is fixed onto a transfer material by melt-fusion fixation using hot pressure rollers or radiation heating or by pressure fixation using pressure rollers. The heat energy and pressure may preferably be smaller in view of the economical factors, structural stability and easiness of designing. Accordingly, there has been a tendency to use a soft developer component having a low melt viscosity, a low melting point and a low yield pressure. On the other hand, it is also important to include a rigid component in the developer with respect to durability, fixability and anti-offset characteristic.

In order to satisfy such mutually contradictory factors, it is generally advantageous that the toner is composed from a binder resin having a molecular weight distribution providing both a soft and a rigid component.

However, such a tendency with a developer is liable to promote the above-mentioned problems accompanying the developer-carrying member.

SUMMARY OF THE INVENTION

A general object of the present invention is to provide an image forming apparatus having solved the above-mentioned problems.

A more specific object of the present invention is to provide an image forming apparatus which includes a developing sleeve capable of carrying a uniform toner layer thereon.

Another object of the present invention is to provide an image forming apparatus suffering from little sleeve memory (ghost image due to toner particles not used in a prior developing operation).

A further object of the present invention is to provide an image forming apparatus showing excellent environmental stability.

According to the present invention, there is provided an image forming apparatus, comprising: an image-bearing member for bearing an electrostatic latent image, and a developing apparatus for developing the latent image, the developing apparatus comprising:

a developer container for containing a toner; and a developer-carrying member for carrying and conveying the toner contained in the developer container to a developing zone opposite the image-bearing member, the developer-carrying member having a coating layer containing electroconductive fine particles;

wherein the toner comprises a binder resin composition which contains 10–70 wt. % of a THF (tetrahydrofuran)-insoluble content and the remainder of a THF-soluble content including a component with a molecular weight of 10000 or below on a GPC (gel permeation chromatography) chromatogram of the THF-soluble content constituting 10–50 wt. % of the binder resin.

According to another aspect of the present invention, there is provided a facsimile apparatus, comprising an electrophotographic apparatus and a receiving means for receiving image data from a remote terminal, wherein said electrophotographic apparatus comprises an image forming apparatus as described above.

According to a further aspect of the present invention, there is provided an apparatus unit including an image bearing member and a developing apparatus as described above, wherein the developing apparatus is supported integrally together with the image-bearing member to form a single unit, which can be connected to or released from an apparatus body as desired.

These and other objects, features and advantages of the present invention will become more apparent upon a consideration of the following description of the preferred embodiments of the present invention taken in conjunction with the accompanying drawings.

DETAILED DESCRIPTION OF THE INVENTION

First, the developing apparatus used in the present invention will be explained with reference to the drawings.

Figure 1:
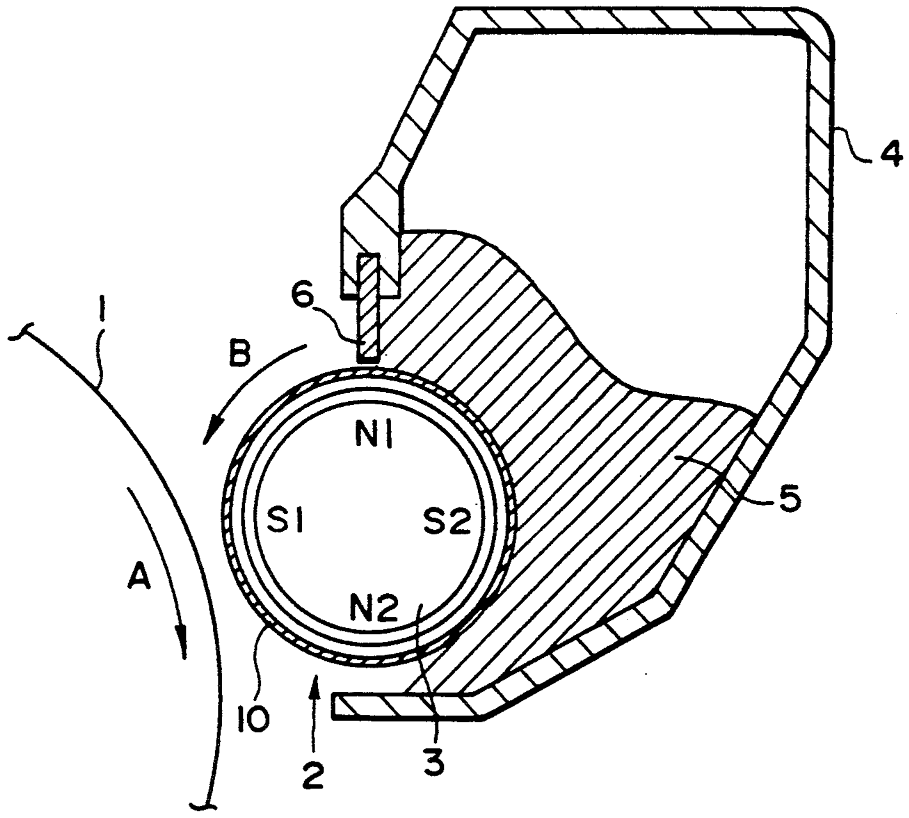
FIG. 1 is a schematic sectional view of a developing apparatus relating to the present invention.

FIG. 1 is a sectional view of an embodiment of the developing apparatus according to the present invention. Referring to FIG. 1, the developing apparatus is used in combination with a photosensitive drum 1 as an electrostatic latent image-bearing member bearing an electrostatic latent image and rotating in the direction of an arrow A. The photosensitive drum 1 may have or may not have a surface insulating layer. The photosensitive member can also be in the form of a sheet or belt instead of a drum as shown.

The photosensitive drum may preferably be a laminated OPC photosensitive drum of a small diameter (of 40 mm or smaller) in view to making it light weight and enhancing photosensitivity to a laser beam.

The developing apparatus includes a developing sleeve 2 as a developer-carrying member carrying a toner 5 thereon and rotating in the direction of an arrow B. Inside the sleeve 2, a multi-pole permanent magnet 3 is fixed so as not to rotate. The sleeve 2 is surfaced with a coating layer 10 containing electroconductive fine particles as will be described hereinafter. The coating layer 10 may have a thickness of 0.5–30 microns, preferably 2–20 microns. The developing apparatus further includes a developer container 4 which contains the toner 5 so that the toner 5 contacts the surface of the developing sleeve 2. The developing apparatus further includes a doctor blade 6 regulating the layer of the toner 5 carried by the developing sleeve 2 from the developer container 4 to a prescribed thickness. It is preferred that the doctor blade 2 is disposed to leave a spacing of about 50–500 microns from the sleeve 2 surface.

When the sleeve 2 rotates in the direction of the arrow B in operation of the above-constructed developing apparatus, the toner 5 in the developer container 4 is provided with a charge of a polarity which is opposite to that of the electrostatic latent image on the photosensitive drum 1 in the case of normal development or the same as that of the electrostatic latent image on the photosensitive drum 1 in the case of reversal development, principally due to triboelectrification between the sleeve 2 surface and the toner 5. The toner 5 layer applied on the sleeve is further regulated to a uniform and small thickness of about 30–300 microns by the doctor blade 6 disposed opposite to one pole (N pole in the figure) of the multi-pole permanent magnet 3 and then conveyed to a developing zone formed by the photosensitive drum 1 and the sleeve 2.

In the developing zone, the toner 5 on the sleeve 2 may be transferred to the photosensitive drum 1, e.g., under the action of a bias voltage such as an AC bias or pulsed bias applied between the sleeve 2 and the photosensitive drum 1 surface.

Now, the coating layer 10 formed on the sleeve 2 will be described in more detail.

The coating layer 10 may comprise electroconductive fine particles dispersed in a film-forming polymer.

The electroconductive fine particles may preferably have a volume resistivity of 0.5 ohm.cm or below after compression under a pressure of 120 kg/cm$^2$. Preferred examples thereof may include carbonaceous fine particles of conductive carbon, crystalline graphite and mixtures of these. The electroconductive fine particles may preferably have a particle size in the range of 0.005–10 microns, particularly 0.01–10 microns.

The crystalline graphite may be generally classified into natural graphite and artificial graphite. Artificial graphite may for example be prepared by shaping pitch coke together with a binder such as tar pitch, followed by calcination at a temperature on the order of 1200° C. and graphitization in a furnace at a high temperature on the order of 2300° C. to convert the carbon into graphite through crystal growth. Natural graphite has been produced through application of subterranean heat and high pressure in nature for a long term and is made from the earth. These graphites have various excellent properties so that they find a wide variety of industrial uses. More specifically, graphite is a dark gray or black, glossy, crystalline mineral which is very soft and lubricative and high in heat resistance and chemical stability. The crystal system is generally hexagonal but can also be rhombohedral. Further, graphite has a layered structure and also a good electroconductivity because of free electrons present between carbon-to-carbon bonds. The graphite used in the present invention can be either natural or artificial. The graphite particles may preferably have a particle size of 0.5–10 microns.

Electroconductive amorphous carbon, such as so-called "carbon black", may be generally defined as "a mass of crystallites obtained by subjecting a hydrocarbon or a carbon-containing compound to combustion or pyrolysis under insufficient supply of air". Electroconductive (amorphous) carbon may have a particularly excellent electroconductivity, can provide a polymer material with an electroconductivity when added into the latter and can be made to provide an arbitrary value of electroconductivity to some extent by controlling the addition amount. The electroconductive carbon fine particles may have a particle size of 5–100 m$\mu$ (millimicron), preferably 10–80 m$\mu$, more preferably 15–40 m$\mu$.

Examples of the film forming polymer may include: thermoplastic resins, such as styrene resins, vinyl resins, polyethersulfone resins, polycarbonate resins, polyphenylene oxide resins, polyamide resins, fluorine-containing resins, cellulose resins and acrylic resins; and thermosetting or photosetting resins, such as epoxy resins, polyester resins, alkyd resins, phenolic resins, melamine resins, polyurethane resins, urea resins, silicone resins, and polyimide resins. Among these, it is preferred to use a polymer having a releasability such as silicone resin or fluorine-containing resin; or a polymer having excellent mechanical properties, such as polyethersulfone, polycarbonate, polyphenylene oxide, polyamides, phenolic resin, polyether, polyurethane resin, or styrene resin. A particularly preferred example may be phenolic resin.

The electroconductive fine particles may preferably be used in a proportion of 3–20 wt. parts per 10 wt. parts of the film-forming polymer. When carbon particles and graphite particles are used in combination, it is preferred to use 1-50 wt. parts of the former per 10 wt. parts of the latter. Further, it is preferred to set the volume resistivity of the resulting coating layer to a value within the range of $10^{-6}$ to $10^{6}$ ohm.cm.

Next, the toner as a principal component of the developer used in the present invention will be explained. The binder resin of the toner used in the invention is required to have an accurately controlled molecular weight distribution. More specifically, the THF-insoluble content of the binder resin is controlled within the range of 10-70 wt. %. Further, the THF-soluble content includes a component of molecular weight being 10,000 or below on the GPC chromatogram in a proportion of 10-50 wt. %, preferably 20-39 wt. % of the binder resin. In order to provide satisfactory performances, it is further preferred that the GPC chromatogram provides a peak in the molecular weight range of 2000 or above to below 15000, more preferably 2000 to 10000, further preferably 2000 to 8000, and a peak or shoulder in the molecular weight range of 15,000 to 100,000, more preferably 20,000 to 70,000.

If the component of molecular weight being 10,000 or below exceeds 50 wt. %, the toner can adhere to the apparatus during the step of toner application onto a developer-carrying member, and this tendency is promoted if the THF-insoluble content is below 10 wt. %.

In the case where the THF-insoluble content exceeds 70 wt. %, the toner per se is caused to have too large a rigidity so that the developer-carrying member is liable to be damaged to promote the toner sticking onto the apparatus members. This tendency is more pronounced when the molecular weight portion of 10,000 or below is less than 10 wt. %.

From the above, it is preferred for the binder resin to satisfy the above-mentioned molecular weight distribution so as to obviate difficulties accompanying the use of the toner for hot-melt fixation.

Herein, the THF-soluble content refers to a polymer component (substantially a crosslinked polymer component) which is insoluble in THF solvent (tetrahydrofuran) in the resin composition (binder resin) constituting a toner, and it may be used as a parameter for indicating the degree of crosslinking of the resin composition containing a crosslinked component. It is to be noted however that a polymer having a low degree of crosslinking can be soluble in THF. For example, a crosslinked polymer obtained through solution polymerization can be THF-soluble even if it has been obtained in the presence of a relatively large amount of crosslinking agent such as divinylbenzene.

The THF-insoluble content may be defined as a value obtained in the following manner.

0.5-1.0 g of a toner sample is weighed ($W_1$g) and placed in a cylindrical filter paper (e.g., No. 86R available from Toyo Roshi K.K.) and then subjected to extraction with 100 to 200 ml of solvent extraction by using a Soxhlet's extractor for 6 hours. The soluble content extracted with the solvent THF is recovered by evaporation and dried for several hours at 100° C. under vacuum to measure a weight ($W_2$g) of the THF-soluble content. On the other hand, the weight ($W_3$g) of the components, such as the magnetic material and/or pigment, other than the resin component in the toner is separately measured. Then, the THF-insoluble content is given by the following equation: THF-insoluble content (%)$=[W_1-(W_2+W_3)]/[W_1-W_3]\times 100$ The GPC (gel permeation chromatography) measurement and identification of molecular weight corresponding to the peaks and/or shoulders may be performed under the following conditions.

A column is stabilized in a heat chamber at 40° C., tetrahydrofuran (THF) solvent is caused to flow through the column at that temperature at a rate of 1 ml/min., and 50-200 μl of a sample resin solution in THF at a concentration of 0.05-0.6 wt. % is injected. The identification of sample molecular weight and its molecular weight distribution is performed based on a calibration curve obtained by using several monodisperse polystyrene samples and having a logarithmic scale of molecular weight versus count number. The standard polystyrene samples for preparation of a calibration curve may be those having molecular weights of, e.g., $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$ and $4.48\times10^6$ available from, e.g., Pressure Chemical Co. or Toyo Soda Kogyo K.K. It is appropriate to use at least 10 standard polystyrene samples. The detector may be an RI (refractive index) detector.

For accurate measurement of molecular weights in the range of $10^3$ $-4\times10^6$, it is appropriate to constitute the column as a combination of several commercially available polystyrene gel columns. A preferred example thereof may be a combination of μ-styragel 500, $10^3$, $10^4$ and $10^5$ available from Waters Co.; a combination of Shodex KF-80M, 802, 803, 804 and 805; or a combination of TSK gel G1000H, G2000H, G2500H, G3000H, G4000H, G5000H, G6000H, G7000H and GMH available from Toyo Soda K.K.

The content of a component having a molecular weight of 10,000 or below in the binder resin is measured by cutting out a chromatogram of the corresponding molecular weight portion and calculating a ratio of the weight thereof with that of the chromatogram covering the molecular weight range of 10,000 or higher, to derive the weight % thereof in the whole binder resin including the above-mentioned THF-insoluble content.

The present invention is particularly effective when applied to a magnetic toner containing a magnetic material. It is preferable to select a magnetic material having a good dispersibility in a binder resin containing a THF-insoluble content. The magnetic material may have a bulk density of 0.3 g/ml or higher, preferably 0.6 g/ml or higher, more preferably 0.8 g/ml or higher, still more preferably in the range of 0.9-1.5 g/ml. If the bulk density is below 0.35 g/ml, the dispersion of the magnetic material in the toner can be insufficient to cause localization of the magnetic material so that the effect of the binder resin having a strictly restricted molecular weight distribution may not be fully exhibited.

In the case where the magnetic material comprises cubic crystals, the particles are liable to damage the surface coating layer of the developing sleeve and the photosensitive member surface because of their angular shape so that spherical particles providing a rather large bulk density are preferred.

The bulk density of a magnetic material may for example be increased by treating the material by a means, such as a fret mill.

The bulk density (g/cc) used herein refers to a value measured according to JIS (Japanese Industrial Standards) K-5101.

The spherical magnetic material may preferably have a remanence ($\sigma r$) of 5 emu/g or below and a coercive force (Hc) of 100 oersted (Oe) or below.

The magnetic material may preferably be contained in a proportion of 10–70 wt. % of the toner.

The toner resin composition used in the present invention may suitably comprise a product of polymerization of one or more monomers selected from styrene monomers, acrylic acid monomers, methacrylic acid monomers and derivatives of these in view of developing performances and charging characteristic. Examples of the styrene monomers may include: styrene, α-methylstyrene, vinyltoluene, and chlorostyrene. Examples of the acrylic acids, methacrylic acids and their derivatives may include: acrylic acid and acrylic acid esters, such as methyl acrylate, ethyl acrylate, propyl acrylate, butyl acrylate, octyl acrylate, 2-ethylhexyl acrylate, n-tetradecyl acrylate, n-hexadecyl acrylate, lauryl acrylate, cyclohexyl acrylate, diethylaminoethyl acrylate, and dimethylaminoethyl acrylate; and methacrylic acid and methacrylic acid esters, such as methyl methacrylate, ethyl methacrylate, propyl methacrylate, butyl methacrylate, amyl methacrylate, hexyl methacrylate, 2-ethylhexyl methacrylate, octyl methacrylate, decyl methacrylate, dodecyl methacrylate, lauryl methacrylate, cyclohexyl methacrylate, phenyl methacrylate, 2-hydroxyethyl methacrylate, 2-hydroxypropyl methacrylate, dimethylaminoethyl methacrylate, glycidyl methacrylate, and stearyl methacrylate. In addition to the above monomers, it is possible to use another monomer, such as acrylonitrile, 2-vinylpyridine, 4-vinylpyridine, vinylcarbazole, vinyl methyl ether, butadiene, isoprene, maleic anhydride, maleic acid, maleic acid mono-esters, maleic acid diesters, and vinyl acetate, in a minor amount which does not adversely effect the present invention.

A crosslinking agent may be used to provide a THF-insoluble content in the binder resin composition. Examples of difunctional crosslinking agents may include: divinylbenzene, bis(4-acryloxypolyethoxyphenyl) propane, ethyleneglycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester-type acrylates (e.g., one known by a trade name of "MANDA", available from Nihon Kayaku K.K.), and methacrylates obtained by substituting methacrylate groups for the acrylate groups in the above acrylates.

Examples of polyfunctional crosslinking agents may include: pentaerythritol triacrylate, trimethylolethane triacrylate, trimethylolpropane triacrylate, tetramethylolmethane tetraacrylate, oligoester acrylate, methacrylates corresponding to the above acrylates, 2,2-bis(4-methacryloxypolyethoxyphenyl) propane, diallyl phthalate, triallyl cyanurate, triallyl trimellitate and diallyl chlorendate.

In the present invention, it is preferred to use, as a binder resin, a resin composition comprising a non-crosslinked or crosslinked first vinyl polymer or copolymer (preferably of a styrene-type) and a crosslinked second vinyl polymer or copolymer (preferably of a styrene-type).

The binder resin according to the present invention may suitably be prepared through a process for synthesizing two or more polymers or copolymers.

For example, a first polymer or copolymer soluble in THF and also in a polymerizable monomer is dissolved in such a polymerizable monomer, and the monomer is polymerized to form a second polymer or copolymer, thus providing a resin composition comprising a uniform mixture of the first polymer or copolymer and the second polymer or copolymer.

The first polymer or copolymer soluble in THF may preferably be formed through solution polymerization or ionic polymerization. The second polymer or copolymer providing a THF-insoluble content may preferably be prepared through suspension polymerization or bulk polymerization of a monomer dissolving the first polymer or copolymer in the presence of a crosslinking monomer. It is preferred that the first polymer or copolymer is used in a proportion of 10–120 wt. parts, particularly 20–100 wt. parts, per 100 wt. parts of the polymerizable monomer giving the second polymer or copolymer.

Examples of the magnetic material contained in a magnetic toner according to the present invention may include: iron oxide or a compound of a divalent metal and iron oxide, such as magnetite, hematite, and ferrites; metals, such as iron, cobalt and nickel, and alloys of these metals with other metals, such as aluminum, cobalt, copper, lead, magnesium, tin, zinc, antimony, beryllium, bismuth, cadmium, calcium, manganese, selenium, titanium, tungsten and vanadium; and mixtures of these materials.

In order to control the chargeability of the toner, it is possible to use a charge control agent such as:

Nitrofumic acid and its salts as disclosed in JP-A 50-13338, dyes or pigments such as C.I. 14645, complexes of metals such as Zn, Al, Co, Cr and Fe with salicylic acid, naphthoic acid and dicarboxylic acid, sulfonated copper phthalocyanine pigment, styrene oligomer to which nitrile group or halogen group has been introduced, and chlorinated paraffin. In view of dispersibility, it is preferred to select one from metal complex salts of monoazo dyes, metal complexes of salicylic acid, metal complexes of alkylsalicylic acids, metal complexes of naphthoic acid and metal complexes of dicarboxylic acids.

Good results may also be obtained if some additives are added, as desired, to the toner according to the present invention. Examples of such additives may include: lubricants, abrasives, fluidity-imparting agents, anti-caking agents, electroconductivity-imparting agents, fixing acids, and anti-offset agents.

Examples of the lubricants may include: fine powder of materials, such as polytetrafluoroethylene, zinc stearate, and polyvinylidene fluoride, among which polyvinylidene fluoride fine powder is preferred.

Examples of the abrasives may include: fine powders of materials, such as cerium oxide, silicon carbide, and strontium titanate, among which fine powder of strontium titanate is preferred.

Examples of the fluidity-imparting agents may include: fine powders of colloidal silica, hydrophobic colloidal silica, and aluminum oxide, among which hydrophobic colloidal silica fine powder is preferred.

Examples of the electroconductivity-imparting agents may include: fine powders of materials, such as carbon black, zinc oxide, antimony oxide and tin oxide.

Examples of the fixing aids or anti-offset agents may include: low-molecular weight polyethylene, low-molecular weight polypropylene and various waxes.

It is also possible to use small quantities of white fine powder and black fine powder with a triboelectric chargeability of a polarity opposite to that of the toner particles in order to improve the developing characteristic.

The above-mentioned hydrophobic colloidal silica may preferably be hydrophobic colloidal silica treated with a silicone oil or silicone varnish.

The silicone oil or silicone varnish preferably used in the present invention may be those represented by the following formula:

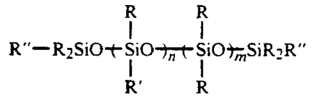

wherein R: a $C_1$–$C_3$ alkyl group, R′: a silicone oil-modifying group, such as alkyl, halogen-modified alkyl, phenyl, and modified-phenyl, R″: a $C_1$–$C_3$ alkyl or alkoxy group.

Specific examples thereof may include: dimethylsilicone oil, alkyl-modified silicone oil, α-methylstyrene-modified silicone oil, chlorophenyl-silicone oil, and fluoro-modified silicone oil. The above silicone oil may preferably have a viscosity at 25° C. of about 50–1000 centi-stokes. A silicon oil having too low a molecular weight can generate a volatile matter under heating, while one having too high a molecular weight has too high a viscosity leading to a difficulty in handling.

In order to treat the silica fine powder with silicone oil, there may be used a method wherein silica fine powder treated with a silane coupling agent is directly mixed with a silicone oil by means of a mixer such as Henschel mixer; a method wherein a silicone oil is sprayed on silica as a base material; or a method wherein a silicone oil is dissolved or dispersed in an appropriate solvent, the resultant liquid is mixed with silica as a base material, and then the solvent is removed to form a hydrophobic silica.

It is further preferred to treat the inorganic fine powder first with a silicone oil or silicone varnish.

When the inorganic fine powder is treated only with a silicone oil, a large amount of silicone oil is required, so that the fine powder can agglomerate to provide a developer with a poor fluidity and the treatment with a silicone oil must be carefully performed. However, if the fine powder is first treated with a silane coupling agent and then with a silicone oil, the fine powder is provided with a good moisture resistance while preventing agglomeration of the powder and thus the treatment effect with a silicone oil can be sufficiently exhibited.

The silane coupling agent used in the present invention may be hexamethyldisilazane or those represented by the formula: $R_mSiY_n$, wherein R: an alkoxy group or chlorine atom, m: an integer of 1–3, Y: alkyl group, vinyl group, glycidoxy group, methacryl group or other hydrocarbon groups, and n: an integer of 3–1. Specific examples thereof may include: dimethyldichlorosilane, trimethylchlorosilane, allyldimethylchlorosilane, allylphenyldichlorosilane, benzyldimethylchlorosilane, vinyltriethoxysilane, γ-methacryloxypropyltrimethoxysilane, vinyltriacetoxysilane, divinylchlorosilane, and dimethylvinylchlorosilane.

The treatment of the fine powder with a silane coupling agent may be performed in a dry process wherein the fine powder is agitated to form a cloud with which a vaporized or sprayed silane coupling agent is reacted, or in a wet process wherein the fine powder is dispersed in a solvent into which a silane coupling agent is added dropwised to be reacted with the fine powder.

The silicone oil or silicone varnish may be used in an amount of 1–35 wt. parts, preferably 2–30 wt. parts, to treat 100 wt. parts of the inorganic fine powder. If the amount of the silicone oil or silicone varnish is too small, it is possible that the moisture resistance is not improved and fails to provide high quality copy images. If the silicone oil or silicone varnish is too much, the inorganic fine powder is liable to agglomerate and even result in free silicone oil or silicone varnish, thus leading to failure in improving the fluidity of the developer.

The hydrophobic colloidal silica may preferably be used in a proportion of 0.1–3.0 wt. parts, particularly 0.6–1.6 wt. parts, per 100 wt. parts of the toner.

The toner used in the present invention may be prepared by a method in which toner constituents are kneaded well in a hot kneading means, such as a kneader or extruder, mechanically crushed and classified; a method wherein a binder resin solution containing other components dispersed therein is spray-dried; a polymerization method wherein prescribed ingredients are dispersed in a monomer constituting a binder resin and the mixture is emulsified, followed by polymerization of the monomer to provide a polymer; etc.

Figure 2:
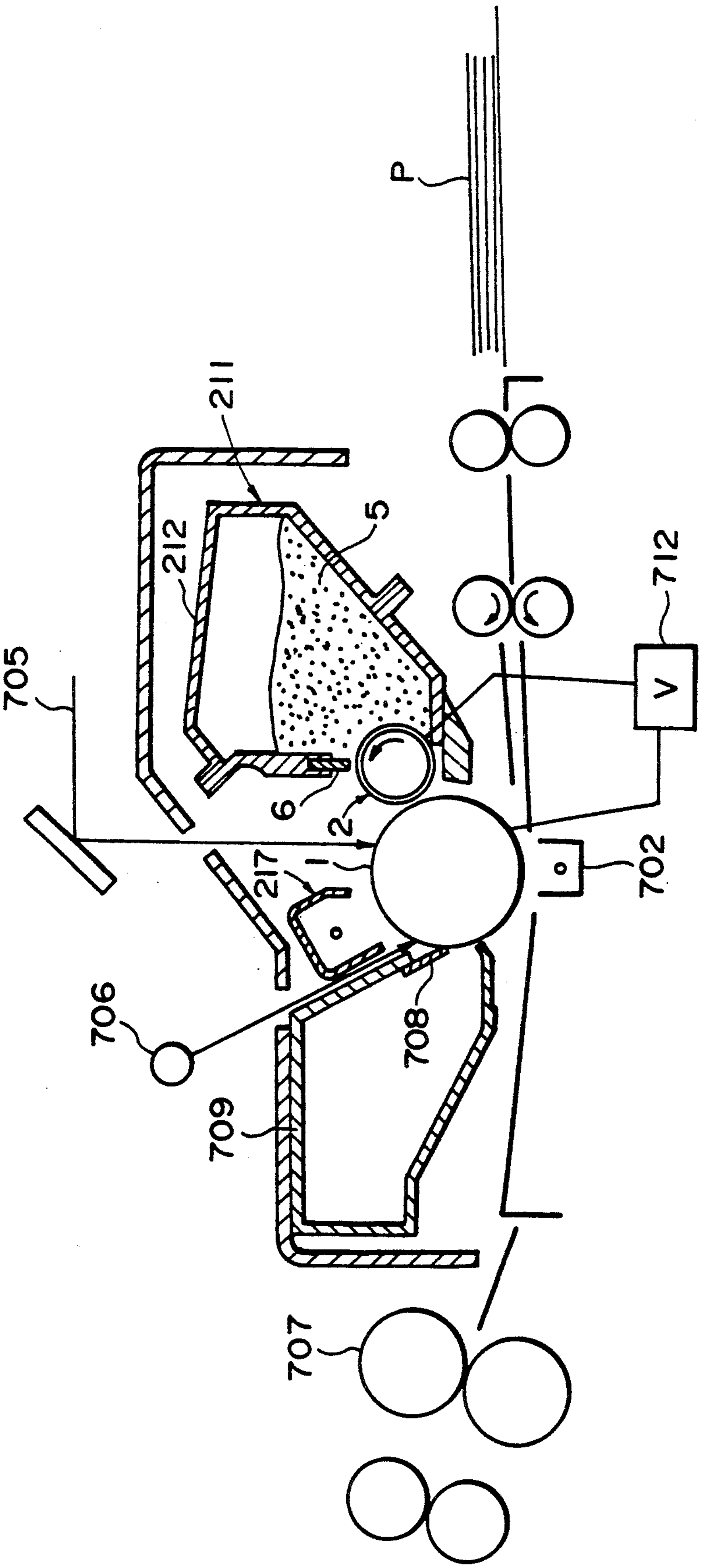
FIG. 2 is a schematic sectional view of an embodiment of the image forming apparatus according to the present invention.

Referring to FIG. 2, an embodiment of the image forming apparatus according to the present invention is explained.

An OPC photosensitive member 1 surface is negatively charged by a primary charger 217, subjected to image-scanning with laser light 705 to form a digital latent image, and the resultant latent image is reversely developed with a negatively chargeable monocomponent magnetic developer 5 contained in a developer container 212 of the developing apparatus 211 which also includes a magnetic blade 6 and a developing sleeve 2 enclosing a magnet and covered with a resinous coating containing electroconductive fine particles. In the developing zone, an alternating bias, pulsed bias and/or DC bias is applied between the conductive substrate of the photosensitive drum 1 and the developing sleeve 2 by a bias voltage application means 712. When a transfer paper P is conveyed to a transfer zone, the paper is charged from the back side (opposite side with respect to the photosensitive drum) by a transfer 702, whereby the developed image (toner image) on the photosensitive drum is electrostatically transferred to the transfer paper P. Then, the transfer paper P is separated from the photosensitive drum 1 and subjected to fixation by means of a hot pressing roller 707 for fixing the toner image on the transfer paper P.

Residual monocomponent developer remaining on the photosensitive drum after the transfer step is removed by a cleaner 709 having a cleaning blade 708. The photosensitive drum 1 after the cleaning is subjected to erase-exposure for discharge by an exposure means 706 and then subjected to a repeating cycle commencing from the charging step by the charger 217.

The electrostatic image-bearing member (photosensitive drum) 1 comprises a photosensitive layer and a conductive substrate and rotates in the direction of the arrow. The developing sleeve 2 comprising a non-magnetic cylinder as a toner-carrying member rotates so as to move in the same direction as the electrostatic image holding member 1 surface at the developing zone. Inside the non-magnetic cylinder sleeve 2, a multi-pole permanent magnet (magnet roll) as a magnetic field generating means is disposed so as not to rotate. The monocomponent insulating magnetic developer 5 in the developer container 212 is applied onto the non-magnetic cylinder sleeve 2 and the toner particles are provided with, e.g., a negative triboelectric charge due to friction between the coating surface of the sleeve 2 and the toner particles. Further, the magnetic doctor blade 6 of iron is disposed adjacent to the cylinder surface (with a spacing of 50–500 microns) and opposite to one magnetic pole of the multi-pole permanent magnet, whereby the thickness of the developer layer is regulated at a thin and uniform thickness (30–300 microns) which is thinner than the spacing between the electrostatic image bearing member 1 and the developing sleeve 2 so that the developer layer does not contact the image bearing member 1. The revolution speed of the developing sleeve 2 is so adjusted that the circumferential velocity of the sleeve 2 is substantially equal to or close to that of the electrostatic image bearing member 1. It is possible to constitute the magnetic doctor blade 6 with a permanent magnet instead of iron so as to form a counter magnetic pole. In the developing zone, an AC bias or a pulsed bias may be applied between the developing sleeve 2 and the electrostatic image bearing surface by the biasing means 712. The AC bias may comprise f=200–4000 Hz and Vpp=500–3000 V.

In the developing zone, the toner particles are transferred to the electrostatic image under the action of an electrostatic force exerted by the electrostatic image bearing surface and the AC bias or pulsed bias.

It is also possible to use an elastic blade of an elastic material, such as silicone rubber, instead of the magnetic iron blade, so as to apply the developer onto the developer carrying member and regulate the developer layer thickness by a pressing force exerted by the elastic blade.

Figure 3:
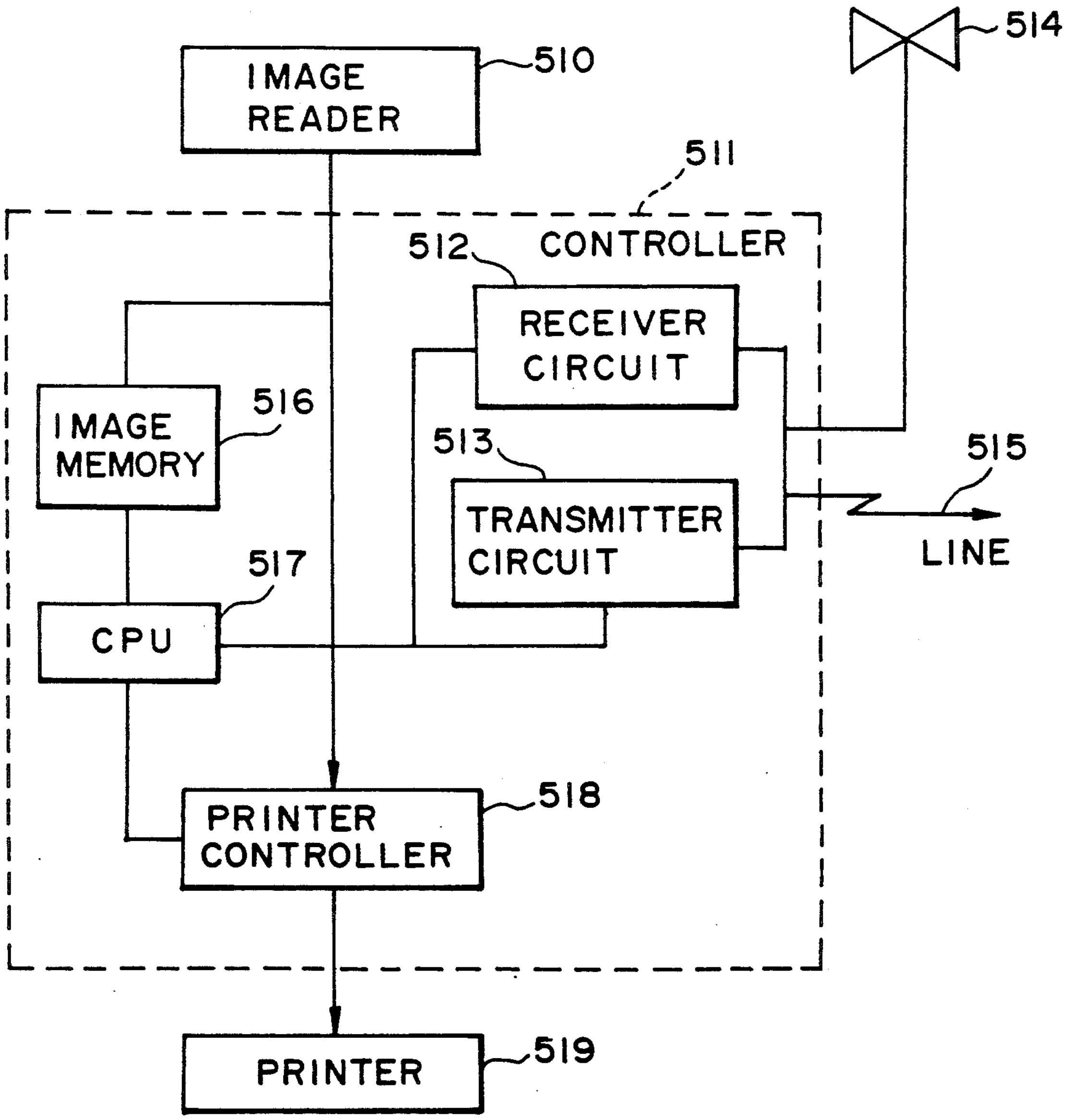
FIG. 3 is a block diagram of a system constituting a facsimile apparatus.

In a case where the image forming apparatus according to the present invention is used as a printer for a facsimile machine, the laser light 705 may be replaced by exposure light image for printing received data. FIG. 3 is a block diagram for illustrating such an embodiment.

Referring to FIG. 3, a controller 511 controls an image reader (or image reading unit) 510 and a printer 519. The entirety of the controller 511 is regulated by a CPU 517. Data read from the image reader 510 is transmitted through a transmitter circuit 513 to a remote terminal such as another facsimile machine. On the other hand, data received from a remote terminal is transmitted through a receiver 512 to a printer 519. An image 516 stores prescribed image data. A printer 518 controls the printer 519. A telephone 514 is connected to the receiver 512 and the transmitter 513.

More specifically, an image received from a line (or circuit) 515 (i.e., image data received a remote terminal connected by the line) is demodulated by means of the receiver circuit 512, decoded by the CPU 517, and sequentially stored in the image memory 516. When image data corresponding to at least one page is stored in the image memory 516, image recording or output is effected with respect to the corresponding page. The CPU 517 reads image data corresponding to one page from the image memory 516. and transmits the decoded data corresponding to one page to the printer controller 518. When the printer 518 receives the image data corresponding to one page from the CPU 517, the printer 518 controls the printer 519 so that image data recording corresponding to the page is effected. During the recording by the printer 519, the CPU 517 receives another image data corresponding to the next page.

Thus, receiving and recording of an image may be effected in the above-described manner.

In the electrophotographic apparatus, plural members inclusive of some of the above-mentioned members such as electrostatic image-bearing member or the photosensitive member, developing apparatus and cleaning means can be integrally combined to form an apparatus unit so that the unit can be connected to or released from the apparatus body. For example, at least one of the charging means, developing apparatus and cleaning means can be integrally combined with the photosensitive member to form a single unit so that it can be attached to or released from the apparatus body by means of a guide means such as a guide rail provided to the body.

Hereinbelow, some synthesis examples of binder resins used in the present invention will be described.

Synthesis Example 1

200 wt. parts of cumene was charged in a reaction vessel and heated to a reflux temperature. Further, a mixture of 100 wt. parts of styrene monomer and 6.5 wt. parts of benzoyl peroxide wa added dropwise thereto in 4 hours under reflux of the cumene. Further, the solution polymerization was completed under reflux of the cumene (146°–156° C.), followed by removal of the cumene. The resultant polystyrene was soluble in THF, showed a main peak at a molecular weight of 4,000 on the GPC chromatogram and showed a Tg (glass transition point) of 57° C.

30 wt. parts of the above polystyrene was dissolved in the following monomer mixture to form a mixture solution.

| (Monomer mixture) | |
|---|---|
| Styrene | 50 wt. parts |
| n-Butyl acrylate | 20 wt. parts |
| Divinylbenzene | 0.26 wt. part |
| di-tert-Butyl peroxide | 2 wt. parts |

To the above mixture solution was added 170 wt. parts of water containing 0.1 wt. part of incompletely saponified polyvinyl alcohol to form a liquid suspension. The suspension was added to a nitrogen-aerated reaction vessel containing 15. wt. parts of water and subjected to 6 hours of suspension polymerization at 70°–95° C. After the reaction, the product was recovered by filtration, de-watered and dried to obtain a composition comprising polystyrene and styrene-n-butyl acrylate copolymer. The composition was a uniform mixture of a THF-soluble content and a THF-insoluble content and was also a uniform mixture of polystyrene and styrene-n-butyl acrylate copolymer. The resin composition was recovered as a powder fraction of 24 mesh-pass and 60 mesh-on. About 0.5 g of the powder was accurately weighed and placed in a cylindrical filter paper with a diameter of 28 mm and a length of 100 mm (No. 86R, available from Toyo Roshi K.K.), and 200 ml of THF was refluxed at a rate of one time per about 4 min. to measure the THF-insoluble as a portion remaining on the filter paper. The resin composition showed a THF-insoluble content of 24 wt. %. The THF-soluble content was subjected to measurement of molecular weight distribution, whereby the resultant GPC chart showed peaks at molecular weights of about 4,500 and about 41,000 and a content of molecular weight being 10,000 or below of 28 wt. %. The resin further showed a Tg of 56° C.

The parameters relating to the molecular weight of resins and resin compositions were measured in the following manner.

Shodex KF-80M (available from Showa Denko K.K.) was used as a GPC column and incorporated in a heat chamber held at 40° C. of a GPC measurement apparatus ("150C ALC/GPC", available from Waters Co.). The GPC measurement was effected by injecting 200 μl of a sample (a THF-soluble concentration of about 0.1 wt. %) into the column, at a THF flow rate of 1 ml/min. and by using an RI (refractive index) detector. The calibration curve for molecular weight measurement was prepared by using THF solutions of 10 monodisperse polystyrene standard samples having molecular weights of $0.5\times10^3$, $2.35\times10^3$, $10.2\times10^3$, $35\times10^3$, $110\times10^3$, $200\times10^3$, $470\times10^3$, $1200\times10^3$, $2700\times10^3$ and $8420\times10^3$ (available from Waters Co.).

Synthesis Example 2

A production method similar to that in Synthesis Example 1 was effected except for adjusting the polymerization temperature to obtain a uniform mixture of polystyrene and styrene-n-butyl acrylate copolymer, which showed a THF-insoluble content of 32 wt. %, a Tg of 60° C. and included a THF-soluble content showing peaks at molecular weights of about 4,800 and about 52,000 and a molecular weight portion of 10000 or below of 32 wt. %.

Synthesis Example 3

150 wt. parts of cumene was charged in a reaction vessel and heated to a reflux temperature, and the following mixture was added dropwise thereto in 4 hours under reflux of the cumene.

| (Monomer mixture) | |
|---|---|
| Styrene | 97 wt. parts |
| n-Butyl acrylate | 3 wt. parts |
| di-tert-Butyl peroxide | 4.2 wt. parts |

Further, the polymerization was completed under reflux of cumene (146°-156° C.), followed by removal of the cumene. The resultant styrene-n-butyl acrylate copolymer showed a main peak at molecular weight of 2,200 and a Tg of 56° C.

35 wt. parts of the above styrene-n-butyl acrylate copolymer was dissolved in the following monomer mixture to form a mixture solution.

| (Monomer mixture) | |
|---|---|
| Styrene | 44 wt. parts |
| Methyl methacrylate | 21 wt. parts |
| Divinylbenzene | 0.25 wt. part |
| Benzoyl peroxide | 0.8 wt. part |

To the above mixture solution was added 170 wt. parts of water containing 0.1 wt. part of incompletely saponified polyvinyl alcohol to form a liquid suspension. The suspension was added to a nitrogen-aerated reaction vessel containing 15. wt. parts of water and subjected to 6 hours of suspension polymerization at 70°-95° C. After the reaction, the product was recovered by filtration, de-watered and dried to obtain a composition comprising a uniform mixture of styrene-n-butyl acrylate copolymer and styrene-methyl methacrylate copolymer.

The resin composition showed a THF-insoluble content of 18 wt. %, and included a THF-soluble content showing peaks at molecular weights of about 3,200 and about 28,000 on the GPC chart and a portion of molecular weight being 10,000 or below of 35 wt. %. The resin showed a Tg of 54° C.

Comparative Synthesis Example 1

A production method similar to that in Synthesis Example 3 was effected except that the polymerization temperature was adjusted to obtain a resin composition, which showed a THF-insoluble content of 8 wt. %, and included a THF-soluble content showing peaks at molecular weights of about 1,700 and $2.2\times10^4$ on the GPC chart and a portion of molecular weight being 10,000 or below of 57 wt. %. The resin showed a Tg of 51° C.

The present invention will be explained more specifically based on the following Examples wherein "parts" used in describing formulations are by weight.

Example 1

| | |
|---|---|
| Resin composition of Synthesis Example 1 | 100 parts |
| Spherical magnetite having a bulk density of 1.0 g/ml | 60 parts |
| Chromium complex of monoazo dye | 1 parts |
| Low-molecular weight polypropylene | 3 parts |

The above ingredients were uniformly blended and kneaded, followed by pulverization and classification to obtain a negatively chargeable magnetic toner having a weight-average particle size of 12 microns.

Further, 0.4 part of hydrophobic colloidal silica fine powder was added to 100 parts of the magnetic toner to obtain a developer comprising a magnetic toner to which hydrophobic colloidal silica was externally added.

A laser beam printer was prepared by remodelling a commercially available laser beam printer (trade name: "LBX-SX", mfd. by Canon K.K.). More specifically, the aluminum developing sleeve was replaced by a coated developing sleeve obtained by coating the aluminum developing sleeve with a 6.5 micron-thick coating layer comprising a composition of 1 part of electroconductive graphite particles having a volume-average particle size of 7 microns and 1 part of phenolic resin and having a volume resistivity of $10-10^3$ ohm.cm.

The above-prepared developer was introduced in the developer container of the developing apparatus of the remodelled laser beam printer and subjected to an image formation test of 3000 sheets. The developing conditions are shown below.

Closest spacing between the laminated OPC photosensitive drum and the coated developing sleeve (enclosing a fixed magnet): about 300 microns.

Spacing between the magnetic blade and the coated developing sleeve: about 250 microns.

Magnetic toner layer thickness on the coated developing sleeve: about 130 microns.

Developing bias: AC (1600 Vpp, 1800 Hz) TDC (−390 V).

Good toner images free from sleeve memory (ghost image or lowering in image density due to toner particles not used in a prior developing operation) were obtained without depending on environmental conditions under various sets of conditions including normal temperature—normal humidity (20° C., 60% RH), high temperature—high humidity (32.5° C., 90% RH) and low temperature—low humidity.

Further, the image formation test was continued up to 5000 sheets while supplying the developer, whereby good images free of defects were obtained. As a result of observation after the test, no toner sticking or damage was observed on the coated developing sleeve.

Example 2

A developer was prepared in the same manner as in Example 1 except that the resin composition of Synthesis Example 2 was used instead of the resin composition of Synthesis Example 1, and subjected to a similar image formation test as in Example 1, whereby good images were obtained. As a result of observation of the coated developing sleeve after the 5000 sheets of image formation, a slight damage was recognized on the sleeve surface but the damage was so slight that no defects were observed in the toner images.

Example 3

A developer was prepared in the same manner as in Example 1 except that the resin composition of Synthesis Example 3 was used instead of the resin composition of Synthesis Example 1, and subjected to a similar image formation test as in Example 1, whereby good images were obtained. As a result of observation of the coated developing sleeve after the 5000 sheets of image formation, a slight sticking of developer was recognized on the sleeve surface but it was so slight that no defects were observed in the toner images.

Comparative Example 1

A developer was prepared in the same manner as in Example 1 except that the resin composition of Comparative Synthesis Example 1 was used instead of the resin composition of Synthesis Example 1, and subjected to a similar image formation test as in Example 1. As a result, in the environment of normal temperature—normal humidity, poor images attributable to developer application irregularity on the sleeve occurred after 3000 sheets. As a result of observation of the developing sleeve, sticking of much developer was observed.

As a result of image formation in the high temperature—high humidity environment, poor images attributable to developer application irregularity on the sleeve was observed after about 1500 sheets.

Example 4

Hydrophobic colloidal silica fine powder was prepared by treating 100 parts of colloidal silica fine powder (Aerosil #200, available from Nihon Aerosil K.K.) with 20 parts of hexamethyldisilazane and then with 10 parts of dimethylsilicone oil ("KF-96 100CS", available from Shin-etsu Kagaku K.K.) diluted with a solvent.

0.7 part of the resultant hydrophobic colloidal silica was blended with 100 parts of the negatively chargeable magnetic toner prepared in Example 1 to obtain a mono-component type developer.

The thus prepared developer was subjected to the same image formation test as in Example 1, whereby an even better durability or large-number successive printing characteristic than the image forming apparatus of Example 1 was attained owing to the lubricating effect given by the silicone oil covering the hydrophobic colloidal silica.

Example 5

The developer prepared in Example 4 was supplied to an image forming apparatus as shown in FIG. 2 and subjected to a image formation test similarly as in Example 1, whereby good results were attained similarly as in Example 4.

The conditions for the image formation as summarized hereinbelow.

(a) A developer-carrying member 2 was prepared by coating a developing sleeve used in the commercially available laser beam printer (LBP-SX) with an about 6 micron-thick coating layer of a composition comprising 8 parts of graphite particles (volume-average particle size of 5 microns), 2 parts of conductive carbon fine particles and 10 parts of phenolic resin.

(b) A laminated OPC photosensitive drum with a diameter of 30 mm was used as an electrostatic image-bearing member 1.

(c) An iron blade 6 was disposed with a spacing of about 250 microns from the coated sleeve.

(d) The closest spacing between the coated sleeve and the OPC photosensitive drum in the developing zone was set to about 300 microns.

(e) A developing bias voltage comprising an AC voltage (1600 Vpp, 1800 Hz) and a DC voltage (−400 V) was applied between the coated sleeve and the photosensitive drum.

(f) Electrostatic images were developed by reversal development mode.

(g) The other conditions were set to the conditions for the laser beam printer (LBP-SX).

As described hereinabove, by using the developer according to the present invention in an image forming apparatus equipped with a developer-carrying member having a coating layer containing electroconductive fine particles, it becomes possible to prevent occurrence of damages to the developer-carrying member surface to prolong the life of the developer-carrying member and also possible to provide good visible images without depending on changes in environmental conditions.

What is claimed is:

1. An image forming apparatus comprising: an image-bearing member for bearing an electrostatic latent image, and a developing apparatus for developing the latent image, the developing apparatus comprising:

a developer container for containing a toner; and a developer-carrying member for carrying and conveying the toner contained in the developer container to a developing zone opposite the image-bearing member, the developer-carrying member comprising a developing sleeve enclosing a magnet and having a coating layer comprising a resin and electroconductive fine particles dispersed therein; and a toner layer thickness-regulating means for regulating the thickness of the toner carried on the developer-carrying member to a value smaller than a spacing between the image-bearing member and the developer-carrying member so that the toner layer is substantially free from contact with the image-bearing member;

wherein the toner comprises a magnetic material and a binder resin composition which contains 10–70 wt. % of a THF (tetrahydrofuran)-insoluble content and the remainder of THF-soluble content including a component with a molecular weight of 10000 or below on a GPC (gel permeation chromatography) chromatogram of the THF-soluble content constituting 10–50 wt. % of the binder resin.

2. The apparatus according to claim 1, wherein said image-bearing member comprises a laminated OPC photosensitive drum.

3. The apparatus according to claim 1, wherein said developer-carrying member comprises a developing sleeve having a surface coating layer in which graphite particles are dispersed.

4. The apparatus according to claim 1, wherein said developer-carrying member comprises a developing sleeve having a surface coating layer in which electroconductive carbon particles are dispersed.

5. The apparatus according to claim 1, wherein said developer-carrying member comprises a developing sleeve having a surface coating layer in which graphite particles and electroconductive carbon particles are dispersed.

6. The apparatus according to claim 1, wherein the electroconductive fine particles are contained in a proportion of 3–20 wt. parts per 10 wt. parts of the resin.

7. The apparatus according to claim 1, wherein said coating layer has a thickness of 0.5–30 microns.

8. The apparatus according to claim 1, wherein said coating layer has a thickness of 2–20 microns.

9. The apparatus according to claim 1, wherein said electroconductive fine particles comprise graphite particles having a particle size of 0.5–10 microns.

10. The apparatus according to claim 1, wherein said electroconductive fine particles comprise electroconductive carbon particles having a particle size of 5–100 mμ.

11. The apparatus according to claim 1, wherein said coating layer comprises graphite particles or electroconductive carbon particles, and a resin selected from the group consisting of silicone resin, fluorine-containing resin, polyethersulfone, polycarbonate, polyphenylene oxide, polyamide, phenolic resin and styrene resin.

12. The apparatus according to claim 1, wherein said coating layer comprises graphite particles and phenolic resin.

13. The apparatus according to claim 1, wherein said coating layer comprises electroconductive carbon particles and phenolic resin.

14. The apparatus according to claim 12, wherein the coating layer comprises 3–20 wt. parts of the graphite particles per 10 wt. parts of the phenolic resin.

15. The apparatus according to claim 1, wherein said toner comprises toner particles and hydrophobic colloidal silica fine powder.

16. The apparatus according to claim 1, wherein said toner comprises magnetic toner particles and hydrophobic colloidal silica fine powder.

17. The apparatus according to claim 1, wherein said binder resin comprises a vinyl polymer or copolymer.

18. The apparatus according to claim 1, wherein said binder resin comprises a styrene polymer or copolymer.

19. The apparatus according to claim 1, wherein said binder resin comprises a non-crosslinked vinyl polymer or copolymer and a crosslinked vinyl polymer or copolymer.

20. The apparatus according to claim 1, wherein said binder resin comprises a non-crosslinked styrene polymer or copolymer and a crosslinked styrene polymer or copolymer.

21. The apparatus according to claim 19, wherein said binder resin comprises a non-crosslinked vinyl polymer or copolymer prepared by solution polymerization and a crosslinked vinyl polymer or copolymer prepared by suspension polymerization.

22. The apparatus according to claim 20, wherein said binder resin comprises a non-crosslinked vinyl polymer or copolymer prepared by solution polymerization and a crosslinked vinyl polymer or copolymer prepared by suspension polymerization.

23. The apparatus according to claim 1, wherein said binder resin comprises a THF-soluble crosslinked first vinyl polymer or copolymer, and a crosslinked second vinyl polymer or copolymer comprising a THF-insoluble matter.

24. The apparatus according to claim 23, wherein the first vinyl polymer or copolymer has been obtained by solution polymerization and the second vinyl polymer or copolymer has been obtained by suspension polymerization.

25. The apparatus according to claim 1, wherein said binder resin comprises a THF-soluble crosslinked first styrene polymer or copolymer, and a crosslinked second styrene polymer or copolymer comprising a THF-insoluble matter.

26. The apparatus according to claim 25, wherein the first styrene polymer or copolymer has been obtained by solution polymerization and the second styrene polymer or copolymer has been obtained by suspension polymerization.

27. The apparatus according to claim 1, wherein said binder resin contains 20–39 wt. % of the component with a molecular weight of 10000 or below.

28. The apparatus according to claim 1, wherein the THF-soluble content of the binder resin provides a GPC chromatogram showing a peak in the molecular weight region of 2000 or more to less than 15000 and a peak or shoulder in the molecular weight region of 15,000–100,000.

29. The apparatus according to claim 1, wherein the THF-soluble content of the binder resin provides a GPC chromatogram showing a peak in the molecular weight region of 2,000–10,000.

30. The apparatus according to claim 1, wherein the THF-soluble content of the binder resin provides a GPC chromatogram showing a peak in the molecular weight region of 2000–8000 and a peak or shoulder in the molecular weight region of 20,000–70,000.

31. The apparatus according to claim 1, wherein said magnetic toner contains a magnetic material having a bulk density of 0.35 g/ml or higher.

32. The apparatus according to claim 1, wherein said magnetic toner contains a magnetic material having a bulk density of 0.6 g/ml or higher.

33. The apparatus according to claim 1, wherein said magnetic toner contains a spherical magnetic material having a bulk density of 0.8 g/ml or higher.

34. The apparatus according to claim 2, wherein said magnetic toner contains 10–70 wt. % thereof of a magnetic material.

35. The apparatus according to claim 16, wherein said hydrophobic colloidal silica fine powder has been treated with a silicone oil or silicone varnish.

36. The apparatus according to claim 1, wherein said developing apparatus further comprises a magnetic blade for regulating the thickness of a magnetic toner layer carried on the developer-carrying member.

37. An apparatus unit comprising: an image-bearing member for bearing an electrostatic latent image, and a developing apparatus for developing the latent image, the developing apparatus comprising:

a developer container for containing a toner; and a developer-carrying member for carrying and conveying the toner contained in the developer container to a developing zone opposite the image-bearing member, the developer-carrying member comprising a developing sleeve enclosing a magnet and having a coating layer comprising a resin and electroconductive fine particles dispersed therein; and a toner layer thickness-regulating means for regulating the thickness of the toner carried on the developer-carrying member to a value smaller than a spacing between the image-bearing member and the developer-carrying member so that the toner layer is substantially free from contact with the image-bearing member;

wherein the toner comprises a magnetic material and a binder resin composition which contains 10–70 wt. % of a THF (tetrahydrofuran)-insoluble content and the remainder of a THF-soluble content including a component with a molecular weight of 10000 or below on a GPC (gel permeation chromatography) chromatogram of the THF-soluble content constituting 10–50 wt. % of the binder resin;

wherein said developing apparatus is supported integrally together with the image-bearing member to form a single unit, which can be connected to or released from an apparatus body as desired.

38. A facsimile apparatus, comprising: an electrophotographic apparatus and a receiving means for receiving image data from a remote terminal, wherein said electrophotographic apparatus comprises: an image-bearing member for bearing an electrostatic latent image, and a developing apparatus for developing the latent image, the developing apparatus comprising:

a developer container for containing a toner; and a developer-carrying member for carrying and conveying the toner contained in the developer container to a developing zone opposite the image-bearing member, the developer-carrying member comprising a developing sleeve enclosing a magnet and having a coating layer comprising a resin and electroconductive fine particles dispersed therein; and a toner layer thickness-regulating means for regulating the thickness of the toner carried on the developer-carrying member to a value smaller than a spacing between the image-bearing member and the developer-carrying member so that the toner layer is substantially free from contact with the image-bearing member;

wherein the toner comprises a magnetic material and a binder resin composition which contains 10–70 wt. % of a THF (tetrahydrofuran)-insoluble content and the remainder of a THF-soluble content including a component with a molecular weight of 10000 or below on a GPC (gel permeation chromatography) chromatogram of the THF-soluble content constituting 10–50 wt. % of the binder resin.

39. The facsimile apparatus according to claim 38, wherein said electrophotographic apparatus comprises an apparatus according to any one of claims 1, 3–6 or 8–38.

* * * * *

UNITED STATES PATENT AND TRADEMARK OFFICE
CERTIFICATE OF CORRECTION

PATENT NO. : 5,153,377

DATED : October 6, 1992

INVENTOR(S) : TETSUHITO KUWASHIMA, ET AL.

It is certified that error appears in the above-identified patent and that said Letters Patent is hereby corrected as shown below:

On the title page,

IN [56] REFERENCES CITED

Insert: --Attorney, Agent, or Firm—Fitzpatrick, Cella, Harper & Scinto--.

COLUMN 3

Line 47, "doctor blade 2" should read --doctor blade 6--.

COLUMN 7

Line 36, "effect" should read --affect--.

COLUMN 8

Line 53, "acids," should read --aids,--.

COLUMN 9

Line 31, "centi-stokes" should read --centistokes-- and "silicon" should read --silicone--.

COLUMN 10

Line 9, "dropwised" should read --dropwise--.
Line 16, "the silicone" should read --the amount of silicone--.
Line 52, "transfer 702," should read --transfer means 702,--.
Line 57, "hot pressing roller 707" should read --hot pressing roller fixer 707--.

UNITED STATES PATENT AND TRADEMARK OFFICE

CERTIFICATE OF CORRECTION

PATENT NO. : 5,153,377

DATED : October 6, 1992

INVENTOR(S) : TETSUHITO KUWASHIMA, ET AL.

It is certified that error appears in the above-identified patent and that said Letters Patent is hereby corrected as shown below:

COLUMN 11

Line 56, "receiver 512" should read --receiver circuit 512--.
Line 57, "image 516" should read --image memory 516-- and "printer 518" should read --printer controller 518--.
Line 58, "telephone 514" should read --telephone handset 514--.
Line 59, "receiver 512" should read --receiver circuit 512-- and "transmitter 513." should read --transmitter circuit 513.--.
Line 61, "received" should read --received from--.

COLUMN 12

Line 3, "printer 518" should read --printer controller 518--.
Line 4, "printer" should read --printer controller--.
Line 31, "wa" should read --was--.

COLUMN 14

Line 34, "1 parts" should read --1 part--.

COLUMN 16

Line 15, "as" should read --are--.

COLUMN 18

Line 66, "claim 2" should read --claim 1--.

CERTIFICATE OF CORRECTION

PATENT NO. : 5,153,377

DATED : October 6, 1992

INVENTOR(S) : TETSUHITO KUWASHIMA, ET AL.

It is certified that error appears in the above-identified patent and that said Letters Patent is hereby corrected as shown below:

COLUMN 19

Line 8, "unit" should read --unit,--.

COLUMN 20

Lines 36-37, "claims 1, 3-6 or 8-38" should read --claims 1-37--.

Signed and Sealed this

Seventh Day of December, 1993

Attest:

BRUCE LEHMAN

Attesting Officer

Commissioner of Patents and Trademarks